INVENTORS
LLOYD O. CRABTREE
JAN A. VAN den BROEK
BY
Barnes, Kisselle, Raisch & Choate
ATTORNEYS INVENTORS
LLOYD O. CRABTREE
JAN A. VAN den BROEK
BY
Barnes, Kisselle, Raisch & Choate
ATTORNEYS INVENTORS
LLOYD O. CRABTREE
JAN A. VAN den BROEK
BY
Barnes, Kisselle, Raisch & Choate
ATTORNEYS INVENTORS
LLOYD O. CRABTREE
JAN A. VAN den BROEK
BY
Barnes, Kisselle, Raisch & Choate
ATTORNEYS 3,427,634

SYNCHRONOUS OPTICAL INTERROGATION SYSTEM

Lloyd O. Crabtree and Jan A. Van den Broek, Ann Arbor, Mich., assignors to Conductron Corporation, Ann Arbor, Mich., a corporation of Delaware Filed Mar. 3, 1965, Ser. No. 436,859

U.S. Cl. 346—108 12 Claims

Int. Cl. G01d 9/42

ABSTRACT OF THE DISCLOSURE

An optical data processing apparatus for transferring or translating, or both, optical information between movable signal and recording films. A light source produces a beam of collimated light which passes from a finite area of the signal film to the input end of an optical processor. The altered optical output signal of the optical processor is recorded on a light sensitive film or media. Deflectors between the light source and the signal film, the signal film and the input of the optical processor, and the output of the optical processor and the recording media are synchronously moved to cause the light beam to be swept laterally across the signal media and then pass into the optical processor and the altered output signal to be swept laterally across the recording media. By simultaneously synchronously interrogating finite areas of the signal and recording media, the apparatus processes signal films which are much larger than the field of view of the optical processor of the apparatus.

This invention relates to optical data processing systems and more particularly to an optical system for transferring and/or translating information indicia between signal and recording media.

In certain optical data processing equipment, a lens system is provided for receiving an optical input, signal and transmitting and translating the signal to produce an optical output signal which represents the results of a mathematical processing of the input data. For example, the lens system may function as an analog computer wherein the optical system functions to interrogate many cycles of information, at any given instant, stored on a film transparency and presents such information in terms of amplitude and spacial distribution of a projected image on a recording medium. In known optical data processing units of this type, the lens system is usually designed to handle a given size of signal film, for example, 16 millimeter. If the signal film happens to be 35 millimeter, another optical data processing unit specifically designed to handle this size of film must be used. For example, an optical processor which is 24" long for handling a 16 mm. film would have to be 16 feet long to handle a film 5" wide. This is beyond convenient size not to mention cost. Since these are very expensive units, this lack of flexibility with regard to film handling capability presents a serious cost problem.

Accordingly, it is one object of the present invention to provide processing equipment for large size films, for example 5, 7, 9", using optical systems not larger or more expensive than those designed, for example, for 35 mm. film. Generally speaking, this object is accomplished in accordance with the present invention by transversely interrogating the "oversize" signal film and projecting the interrogated image through the existing lens system and the equipment, from which it is reflected to the recording film which is simultaneously exposed by coordinated sweeps. In this manner, a given size lens system which has too small an aperture to cover all of the image on the oversize film may also be used in processing the oversize film. The present invention provides a synchronous interrogating mechanism in which the interrogation is achieved by purely mechanical manipulation of optical elements, which elements are much less expensive items than the optical components of the lens system. Hence, the interroating apparatus of the present invention represents in one aspect an inexpensive adaptor mechanism which can greatly increase the flexibility of optical data processing equipment.

Another object of the present invention is to provide an optical data interrogator of the above character wherein coherent collimated light from the film being interrogated is projected in a direction parallel to the optical axis of the optical data processor.

A further object is to provide interrogating means of the above character which provide a constant optical path length between the signal media and the optical data processor as well as a constant optical path length between the optical data processor and the recording media.

Another object of importance to optical data processors which employ cylindrical or conical lens elements is an interrogating means wherein there is no image rotation between the signal media and the optical data processor as well as between the optical data processor and the recording media.

Still another object of the present invention is to provide a synchronous interrogating system for an optical data processor in which the interrogating is accomplished by illuminating a specific finite area of the film which is being interrogated which corresponds to a minimum area which must be considered or processed at a given instant, which may be many times larger than the area covered by the output signal on the recording film, even when the two films are of the same size.

These, as well as other objects, features and advantages of the invention will be apparent from the following detailed description of the invention taken in conjunction with the accompanying drawings wherein.

Figures 1, 3:
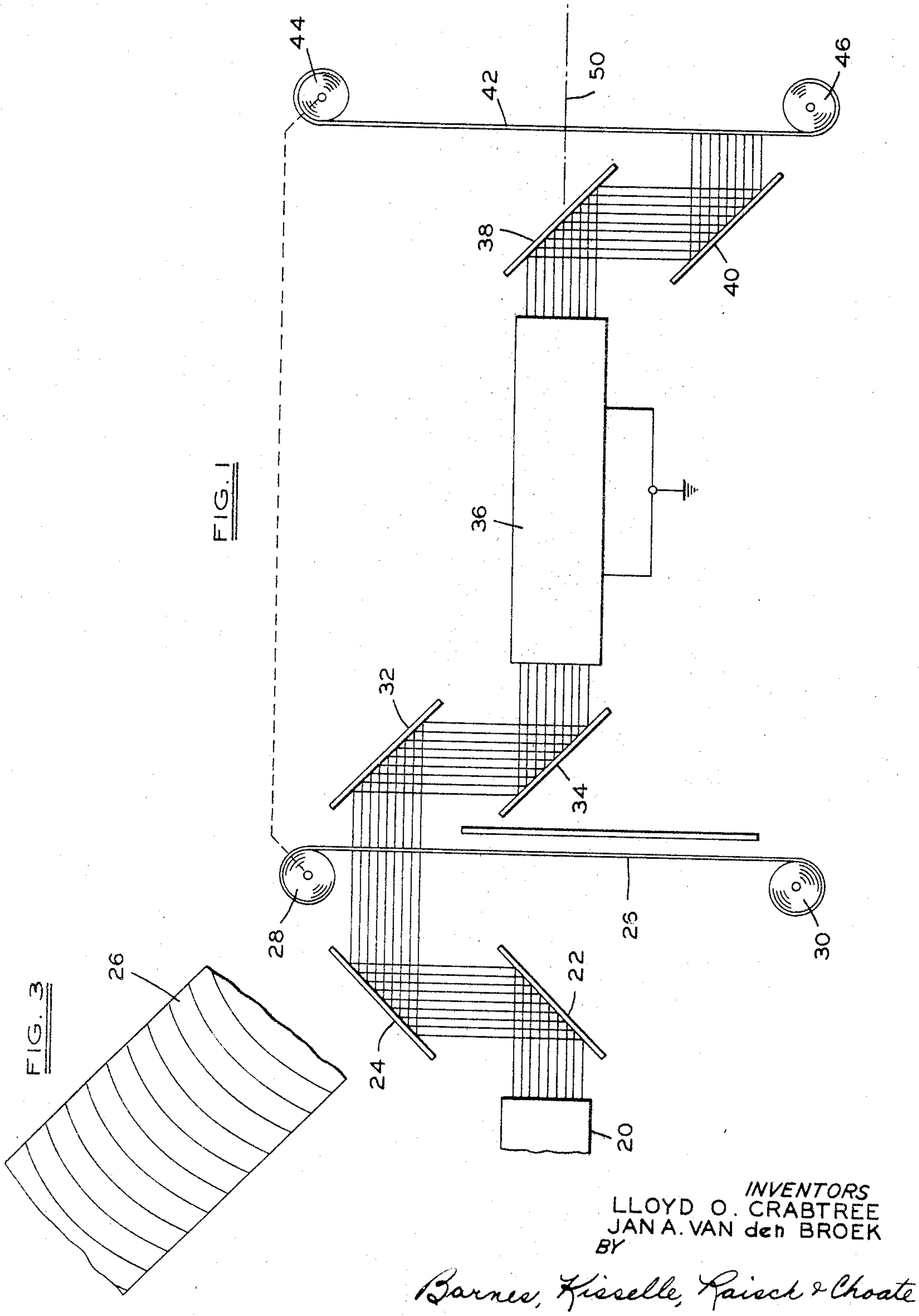
FIGURE 1 illustrates schematically a system of optics involved in one embodiment of the synchronous interrogating apparatus of the invention.
FIGURE 3 shows the path of area scanning sweeps across both the signal and recording media.

Referring to the drawings the first illustrative embodiment of the apparatus comprises a system shown diagrammatically in FIGURE 1. A light source 20 will, in most cases, supply coherent collimated light of the type originating in, for example, a laser light source with suitable lenses for increasing the size of the light bundle and maintaining it in a parallel condition. Light from the light source is directed to a mirror 22 which is angled at 45° to reflect the light to a second mirror 24 which directs the light through a signal film 26 suitably mounted on rollers 28 and 30 so that the film can be moved at any desired rate past the light rays that are interrogating the film.

Light which has passed from mirror 24 through the film 26 reaches an angled mirror 32 and is deflected to an angled mirror 34 which directs the light into the aperture of an optical data processing cylinder 36. This cylinder will contain a system of lenses arranged to perform such optical data processing as is desired, such as, for example, frequency analysis or correlation with other input data. This is sometimes characterized as mathematical processing for ultimate presentation of data in terms of amplitude and spacial distribution. As the light leaves the optical cylinder 36, it reaches an angled mirror 38 and is directed to a second outlet mirror 40 where it moves in a direction perpendicular to the recording film 42 suitably mounted on rollers 44 and 46. It is essential that film 26 and film 42 be moved at exact relative speeds. Accordingly, in the embodiment shown, it is preferable that the two films be moved by a single drive to avoid the necessity for complicated synchronizing mechanism. If the scale between the films is altered, the relative speed would vary accordingly.

The mirrors 22, 24, 32, 34, 38 and 40 are mounted to rotate about a mechanical axis which is coincident with the optical axis 50 which is the optical axis of the light source 20 as well as the optical data processing cylinder 36. As the mirror system is rotated about axis 50, the various portions of the film can be interrogated in a revolving sweep, thus permitting the processing of a film which has a much greater lateral dimension than could be processed at one time in the particular optical system 36. FIGURE 3 illustrates the arcuate sweep of the light rays as they pass the film 26, for example.

Figure 2:
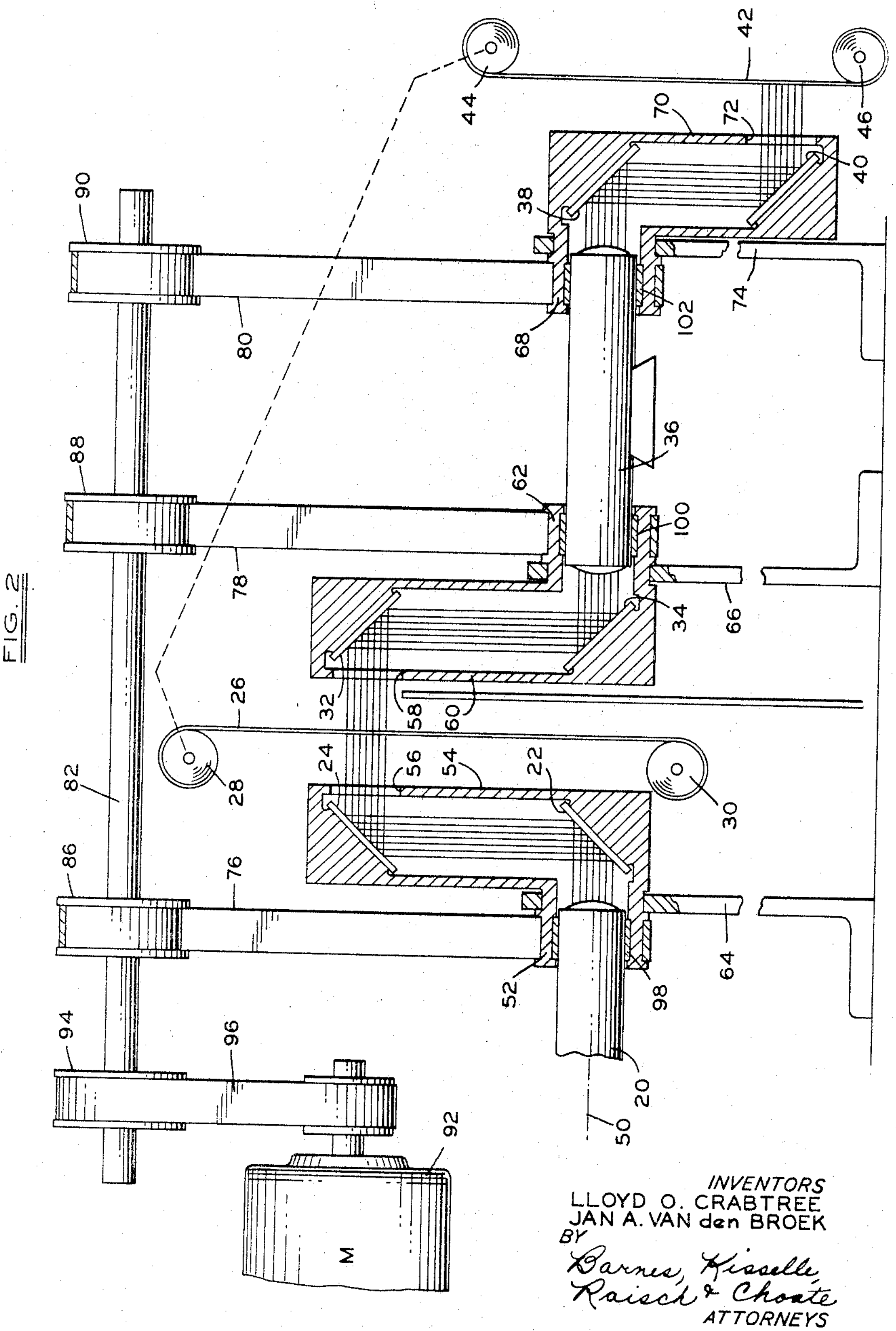
FIGURE 2 illustrates a mechanical system to incorporate the system of FIGURE 1.

In FIGURE 2, a mechanical system for accomplishing the purpose of the diagrammatic system shown in FIGURE 1 is illustrated. According to this system, the collimated light source 20 is directed on the axis 50 which projects into one leg 52 of an L-shaped periscopic tube having another leg 54 which revolves around the axis and which carries the angled mirrors 22 and 24, the leg 54 having an opening 56 to permit light to pass through the film 26 into an opening 58 in a similar leg 60 of an L-shaped periscopic tube. The leg 60 joins with another leg 62 and carries angled mirrors 32 and 34 to direct light into the optical data processing cylinder 36 which is mounted on axis 50 and projects into the leg 62. These L-shaped periscopic tubes are mounted in suitable bearings on brackets 64 and 66 so that they may revolve about the axis 50. The other end of the optical processor cylinder 36 is mounted in a leg 68 of an L-shaped periscopic tube carrying mirrors 38 and 40. The radially extending leg 70 extends away from the axis 50 and has an opening 72 which directs light from the mirror 40 to the recording film 42. The tube 68–70 is mounted on a bracket 74.

The legs 52, 62 and 68 of the periscopic tubes are all provided with a pulley surface on the outside for cooperating with drive belts 76, 78 and 80 all driven from a common shaft 82 through pulleys 86, 88 and 90. Thus, all of the optical apparatus will move at the same rate of speed.

A motor 92 drives a pulley 94 on shaft 82 through a belt 96. This motor can either be a constant speed motor or a variable speed motor depending on the requirements. The end of the light source 20 is suitably mounted in the socket of leg 52 in a bearing 98 and similarly the optical processor cylinder 36 is suitably mounted in bearings 100 and 102 in the respective elements 62 and 68.

It will be noted that the film strips 26 and 42 are so disposed that they pick up the light rays only on one swing of the radially extending arms 54 and 60 on the one hand and 70 on the other hand as they revolve about the axis. If this positioning is not possible, it would be feasible to blank out one sweep of the light rays by a shield or a suitably operated shutter.

The invention is disclosed herein with reference to photographic transparencies referred to in general as signal film or recording film. These terms can also include any image holding or receiving surface, whether opaque or transparent, which can be illuminated with coherent light to furnish or record data. These can be referred to as signal or recording image planes or media.

The operation of the structure shown in FIGURE 2 will be obvious from the above description. The motor 92 drives the shaft 82 which in turn revolves the radially extending periscopic tubes 54–60 and 70 in synchronism about the axis 50 while the light source 20 furnishes light to the optical system. As this rotation takes place, strips of the signal film 26 are interrogated in arcuate paths as shown in FIGURE 3 and identical strips are exposed on the recording film 42. In the device shown, the space between the mirrors 38 and 40 in arm 70 is shorter than the space between the mirrors 32 and 34 in arm 60, thus giving a change in scale between the signal film 26 and the recording film 42. This can be controlled as desired.

It will thus be seen that a relatively wide film strip 26 can be processed by a relatively small optical system in cylinder 36. Thus, the optical processor can be more accurate and much less expensive and still be versatile.

Figure 4:
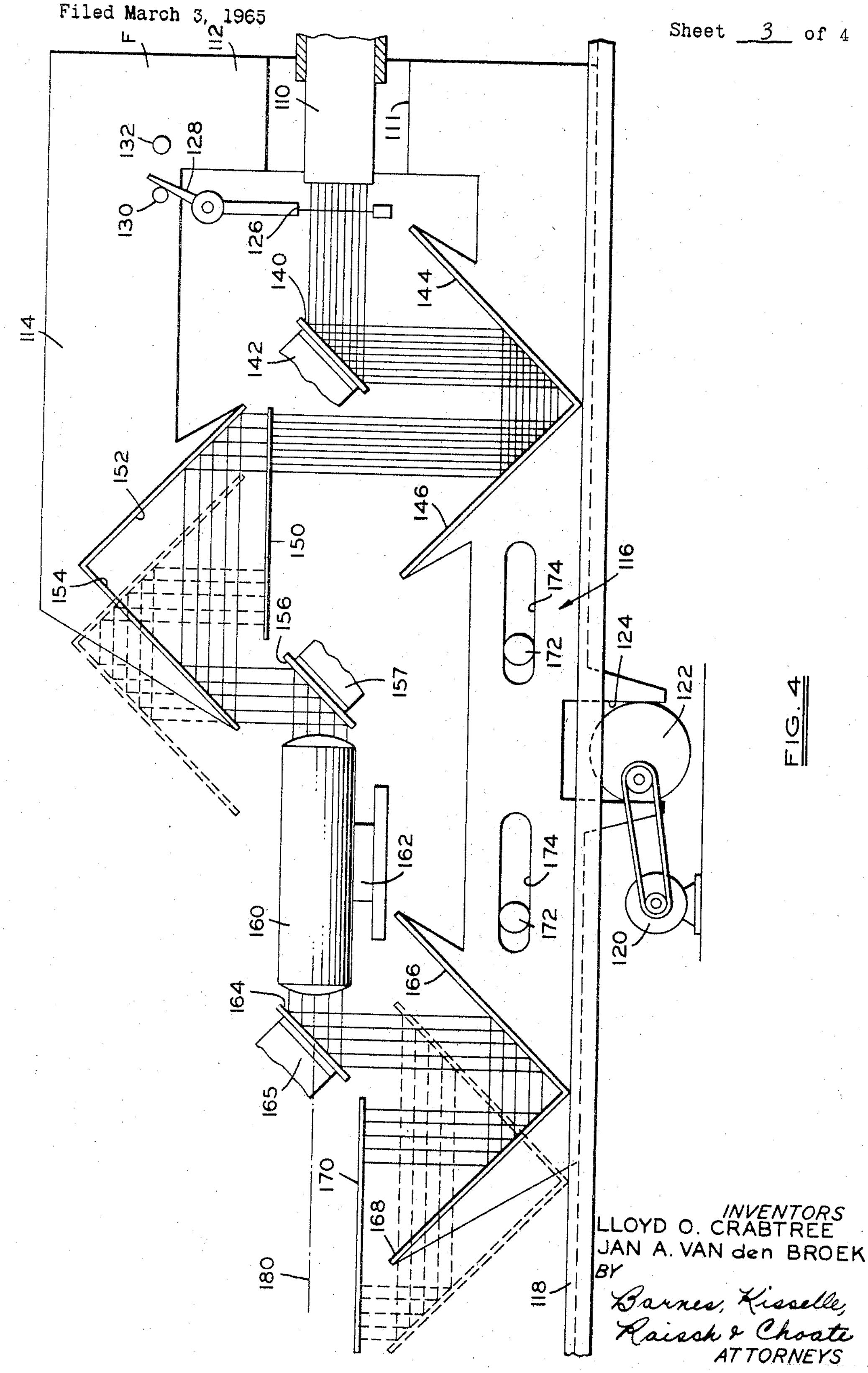
FIGURE 4 is a view of a second embodiment of the interrogating apparatus of the present invention.

FIGURE 4 represents an alternative embodiment of the interrogating apparatus of the invention and in this embodiment, as in that shown in FIGURE 1, it will be recognized that there is a constant optical path length throughout the entire system.

Referring to FIGURE 4, the light source which again preferably produces coherent collimated light, originates in a chamber 110 which is mounted in an opening 111 of a frame F having a vertical member 112, a horizontal cantilever member 114 at the top, and a lower beam member 116 at the bottom. This entire frame is mounted for reciprocation in a suitable track 118, the reciprocation being accomplished through a motor 120 driving an eccentric cam 122 operating in a cam follower recess 124 at the bottom of the frame member 116. A shutter 126 overlying the end of the light source 110 is operated to open and close position by an operating lever 128 which is actuated by pins 130 and 132 on the frame member 114 to prevent double exposure of the film. Light from the source 110 passing through the shutter 126 first strikes a stationary mirror 140 suitably mounted on a bracket 142. From this mirror, light is deflected to one surface mirror 144 of a right angle reflector assembly mounted on frame member 116 and then to a mirror surface 146 opposed to mirror 144 so that light passes upwardly through the signal film 150 to an angled deflecting mirror surface 152 of a right angle reflector assembly and an opposed deflecting mirror 154 of the assembly on upper frame member 114. This light then deflects downwardly to a stationary mirror 156 on bracket 157 and then to the optical data processing cylinder 160 which is also mounted on a stationary bracket 162.

At the other end of the optical processor is a stationary angled mirror 164 mounted on a bracket 165, and this mirror deflects the processed data downwardly to an angled mirror 166 of a right angle mirror assembly and thence to opposed angled mirror 168 of the assembly which is mounted on the bottom frame member 116. From mirror 168, the process data passes at right angles to the recording film 170. The reciprocatory motion of frame F is controlled by the eccentric cam 122 and the bottom frame member 116 is also supported for reciprocation on the stationary pins 172 operating in slots 174.

In the operation of the embodiment of FIGURE 4, the frame F is caused to oscillate, the means of operation being the motor 120 rotating the cam 122 through a suitable drive belt. As the frame F moves back and forth, pins 130 and 132 mounted on the frame strike the shutter lever 128 causing the shutter 126 to be opened for one direction of frame movement and closed for the return stroke. This same effect might be obtained by a microswitch circuit (not shown) to turn the light source on and off coincident with the strokes of the frame. The guide track 118 and the center line of the pins 172 lie parallel to the optical axis 180 of the optical data processor 160 and parallel to the plane of films 150 and 170. Mirrors 144 and 146, 152 and 154, and 166 and 168 are mutually perpendicular and lie at a 45° angle with respect to the optical center line. Thus, without any change of optical path length, the signals from the film 150 are transferred to the recording film 170 over a transverse path which is much wider than the normal usable field of the optical data processing cylinder 160.

The film strips 150 and 170 are mounted suitably for a straight pass transverse of the system described and properly moved in synchronism to obtain accurate re-recording of the processed data. The mounting means for input and output media 150–170 is the same as illustrated in FIGURE 2 for film strips 26–42 with a common drive to effect synchronism of motion.

Figure 5:
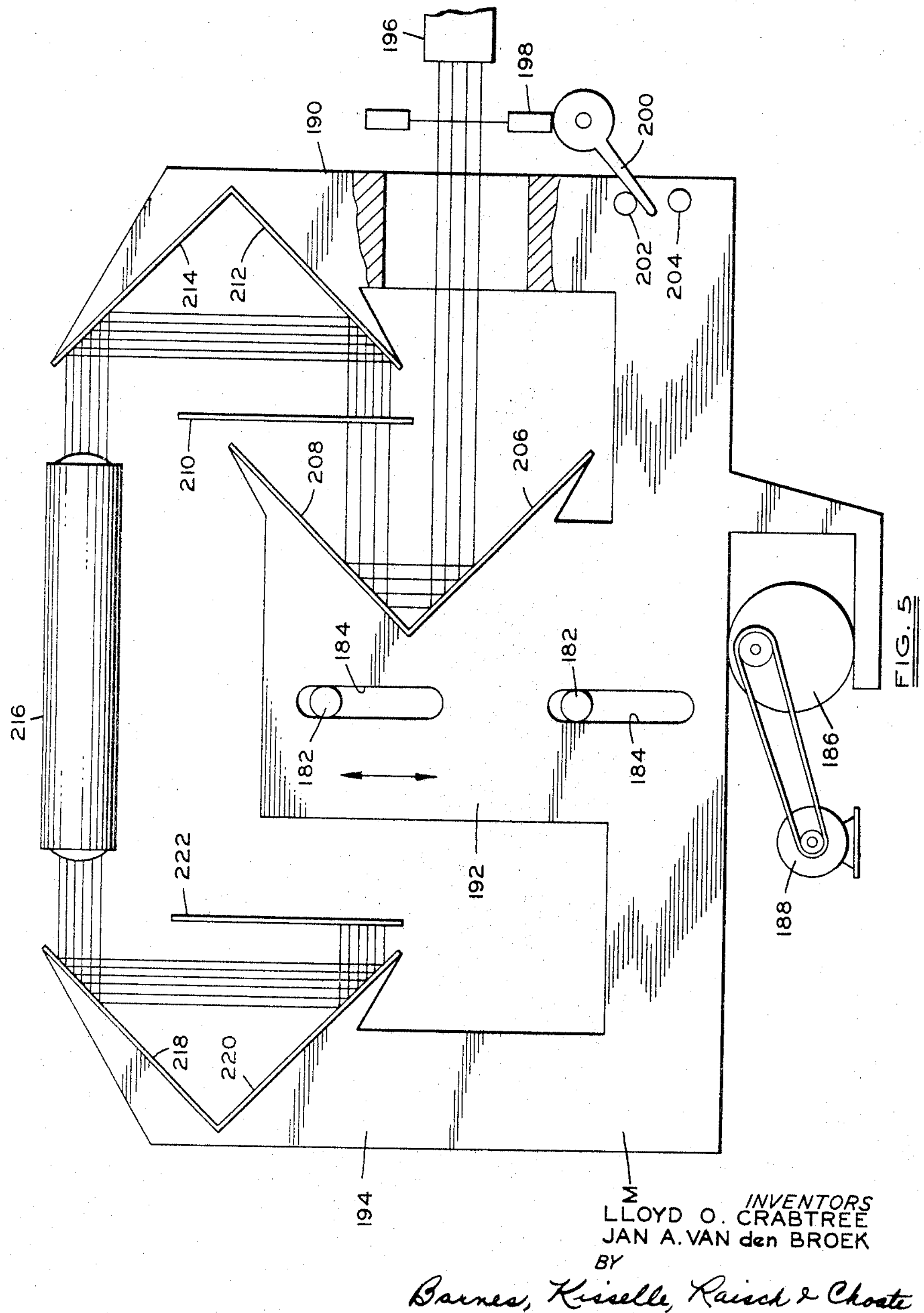
FIGURE 5 is a modified embodiment permitting elimination of some elements of the system shown in FIGURE 4.

In FIGURE 5, a somewhat simplified interrogating system is shown. In this system, frame M, mounted for vertical reciprocation on pins 182 acting in slots 184, is actuated in the reciprocatory motion by a power driven cam 186 operated by a motor 188.

The frame M has a vertical arm 190, a central arm 192 and a third vertical arm 194. Each of these arms respectively carries a right angle mirror assembly in which the mirrors are mutually perpendicular so that light from a source 196 passes a shutter system 198 actuated by a lever 200 and pins 202 and 204. Light passes through a suitable aperture in arm 190 to the assembly of mutually perpendicular mirrors 206 and 208 and then through the optical data film 210 to the assembly of mutually perpendicular mirrors 212 and 214. Mirrors 208 and 212 of the respective assemblies are parallel and oppose each other on opposite sides of the signal film 210. The light is then received through a stationary optical data process system in cylinder 216 from which it passes to the assembly of mutually perpendicular mirrors 218 and 220 and then at right angles to the recording film 222. Thus, in this system the interrogating is accomplished by six mirrors as compared with eight in the system shown in FIGURE 4. The term "mirror" is used in the sense of light deflector.

It is, of course, important that the ratio of the speed of rotation of the sweeping or interrogating light be related to the linear speed of the film so that one sweep will immediately follow another to place the sweeps as close together as possible on the film to economize on the use of film.

It will be noted also that in the embodiments shown, there is no image rotation between the signal media and the optical data processor or between the processor and the recording media. Accordingly, no expensive mechanism for compensating for any rotation is required.

The word "interrogate" is used in the sense of area scanning, i.e., sweeping a transverse area of film. If, for example, the optical system can handle a 35 mm. square area, then the present system allows the 35 mm. processor to be used on 105 mm. film by area scanning.

The device thus constitutes an optical system to interrogate, at any given instant, a relatively large area of a signal transparency and to produce and record a corresponding single element of output signal, the amplitude of which is a function of the character and amplitude of the signal interrogated. The device may also be used in a spectrum analyzer which may be used to analyze recorded frequency data in the form of recorded noise. Thus, many cycles of information stored on a film transparency may be interrogated at any given instant to produce an output signal which represents the results of a mathematical processing of the input data and which presents such information in terms of amplitude and spacial distribution of a projected image on a recording medium.

We claim:

1. A synchronous interrogation system for optical data to interrogate information on a signal media and produce an optical output signal on a recording media utilizing an optical processor with a field area narrower than the media which comprises, a source of collimated light, a signal media mounted to move in a plane intercepting a beam of light from said source, an optical system having a defined field area for receiving an input image of a predetermined area of said signal media resulting from said beam of light passing from said signal media and to produce an optical output signal altered by said optical system, a recording media mounted to move in a plane intercepting said output signal, a first means on one side of said signal media movably mounted for motion with respect to both said optical processor and said signal media and positioned to direct said beam of light onto a portion of said signal media, a second means movably mounted for motion with respect to both said optical processor and said signal media and positioned to direct light passing from said signal media to the input end of said optical system, a third means movably mounted for motion with respect to both said optical processor and said recording media and positioned to receive said output signal of said optical system and to direct said output signal to said recording media, and driving means synchronously moving said first, second and third means with respect to both said optical processor and said media, thereby sweeping said beam of light and said output signal, respectively, in generally transverse traces on and across said signal and recording media.

2. A synchronous interrogation system for optical data to interrogate information on a signal media and produce an optical output signal on a recording media utilizing an optical processor with a field area narrower than the media which comprises, a source of collimated light, a signal media mounted to move in a plane intercepting and perpendicular to a beam of light produced by said source, an optical system having a defined field area for receiving an input image of a predetermined area of said signal media resulting from said beam of light passing from said signal media and to produce an optical output signal altered by said optical system, a recording media mounted to move in a plane intercepting and perpendicular to said output signal, a first deflector means on one side of said signal media movably mounted for motion with respect to both said optical processor and said signal media and positioned to receive said beam of light produced by said light source and to pass it to said signal media at substantially right angles thereto, a second deflector means movably mounted for motion with respect to both said optical processor and said signal media and positioned to direct light passing from said signal media to the input end of said optical system, a third deflector means movably mounted for motion with respect to both said optical processor and said recording media and positioned to receive said output signal of said optical system and to direct said optical signal to said recording media at substantially right angles thereto, and driving means synchronously moving said first, second and third deflector means with respect to both said optical processor and said media, thereby sweeping said beam of light and said output signal, respectively, in generally transverse traces on and across said signal and recording media.

3. A synchronous interrogation system as defined in claim 2 in which said driving means synchronously rotates said first, second and third deflector means with respect to said optical processor and said media.

4. A synchronous interrogation system as defined in claim 2 in which said driving means synchronously reciprocates said first, second and third deflector means with respect to both said optical processor and said media.

5. In an optical data processor, an interrogating system comprising an optical system having an aperture and a lens system therein forming an optical axis, first and second deflectors fixed relative to each other and positioned respectively adjacent the input and output ends of said system coincident with said axis thereof, third and fourth optical elements fixed relative to each other and positioned to cooperate with said first and second deflectors, a signal media and a recording media movable respectively past said third and fourth elements, means for illuminating said signal media with a beam of light which travels from said signal media to said third element, said third element being oriented to transmit at least a portion of said light beam to said first deflector, thence to said aperture and via said lens system to said second deflector and thence to said fourth element, said fourth element being oriented to transmit the beam arriving from said second deflector to said recording media, and means for imparting relative motion between said first and second deflectors and said third and fourth elements such that the area of the signal media being interrogated by said optical system is shifted across said signal media in transverse sweeps and the output signal from said optical system is likewise shifted across said recording media in coordinated transverse sweeps.

6. The interrogating system set forth in claim 5 wherein said third and fourth elements consist of deflectors and said first and second deflectors are oriented relative to said third and fourth elements to transmit said beam of light from the signal media to the recording media wherein the beam between the signal media and said third element is parallel to the beam between said fourth element and the recording media.

7. The combination set forth in claim 6 wherein said light source comprises means for projecting a beam of collimated coherent light, and a deflector fixed relative to said first and second deflectors for deflecting the beam of light from said light source perpendicular to and through said signal media whereby the light emerging from the signal media constitutes the beam of light traveling from the signal media to the third element.

8. In an optical data processor, an interrogating system comprising an optical system having an input and an output end and an effective optical axis and an aperture and lens system adapted to interrogate a multiplicity of items of input data stored on a signal media and to produce an output signal media and to produce an output signal representing the result of a mathematical processing of the input data for presentation in terms of amplitude and spacial distribution, first and second deflectors fixed relative to each other and positioned respectively adjacent the input and output ends of said system coincident with and at 45° to the axis thereof, third and fourth deflectors lying at 90° to said first and second deflectors respectively and fixed relative to each other and to said first and second deflectors to co-operate respectively therewith to transmit light in a beam from said third deflector to said first deflector and thence to optical system to said second deflector, and thence to said fourth deflector, a signal media and a recording media movable respectively past said third and fourth deflectors in a plane at 45° thereto, and means for imparting relative motion between said signal and recording media and said deflectors in a direction parallel to the plane of said media to effect shifting of the light beam across the signal media and shifting of the output signal from said optical system across said recording media in coordinated transverse sweeps.

9. A system as defined in claim 8 in which a stationary light source is positioned adjacent said system to direct a beam in a direction perpendicular to the plane of the signal media, and a pair of deflectors disposed 90° to each other, one overlying the beam at 45° thereto and one overlying the signal media at 45° thereto to receive and redirect the beam to said signal media, said pair of deflectors being fixed relative to said first, second, third and fourth deflectors.

10. A synchronous interrogation system for optical data to interrogate information on a signal plane and produce an optical output signal on a recording plane utilizing an optical processor with a field area narrower than the planes which includes, a source of collimated light, an optical processor on the optical axis of said light source, said processor being in fixed spaced apart relationship to said light source, first and second deflectors in fixed spaced apart relationship to each other and respectively adjacent the input and output end of said optical processor, a signal media interposed between said first deflector and said light source mounted to move in a plane intercepting and perpendicular to light from said source, a light sensitive recording media adjacent to said second deflector and beyond said deflector and said output end mounted to move in a plane intercepting and perpendicular to an optical output signal from said processor, first means positioned to receive light from said source and to pass it to said signal media and thence to said first deflector, said first means cooperating with said first deflector to provide an optical axis through said optical processor, second means in fixed spaced apart relationship to said first means cooperating with said second deflector to pass an optical output signal from said optical processor to said recording media, said first and second means being movable with respect to said signal and recording planes and said light source to sweep light and output image rays, respectively, substantially transversely of said signal and recording planes, and actuating means to synchronously move said first and second means with respect to said signal and recording planes.

11. A synchronous interrogation system for optical data to interrogate information on a signal plane and produce an output signal on a recording plane utilizing an optical processor with a field area narrower than the planes which comprises, a source of collimated light, a signal plane mounted to move in a plane intercepting and perpendicular to light from said source, an optical system having a defined field area for receiving an input image of a relatively large area of a signal plane resulting from said light passing from said plane and to produce an output signal altered by said optical system, a recording media in a recording plane to receive the altered signal mounted to move in a plane intercepting and perpendicular to the output signal axis of said optical system, and means between said light source and said optical system and between said optical system and said recording plane movable to sweep light and output signal rays, respectively, transversely of the signal and recording planes, said light source and said optical system having a common axis, said means comprising three sets of periscopic tubes each having a leg with a deflector means at said axis and a leg extending normal to said axis having a deflector means spaced from said axis, said extending legs being revolvable in synchronism about said axis, two of said tubes directing light at intervals in the revolution through said signal plane at a distance from said axis and thence to the input of said optical system, and the third tube directing output signal of said system at simultaneous intervals in revolution to said recording plane at a distance spaced from said axis.

12. A synchronous interrogation system for optical data to interrogate information on a signal plane and produce an output signal on a recording plane utilizing an optical processor with a field area narrower than the planes which comprises, a source of collimated light, a signal media mounted to move in a plane intercepting and perpendicular to light from said source, an optical system having a defined field area for receiving an input image of a predetermined area of a signal plane resulting from said light passing from said plane and to produce an output signal altered by said optical system, a recording media in a recording plane to receive the altered signal mounted to move in a plane intercepting and perpendicular to the output signal axis of said optical system, and means between said light source and said optical system and between said optical system and said recording plane movable to sweep light and output signal rays, respectively, transversely of the signal and recording planes, said means comprising two right angle deflector assemblies opposed on opposite sides of said signal planes having parallel surfaces optically opposed in space and one assembly having a surface to receive a light beam from said source, and the other surface of said other assembly optically in line with said optical system, and a third right angle deflector assembly having one surface to receive beam output of said optical system and the other surface to overlie said recording plane, and means to create relative motion between said assemblies on the one hand, and said light source, optical system and planes on the other hand in a direction parallel to the said planes and normal to the axis of said system and said light source.

References Cited

UNITED STATES PATENTS

| | | | |
|---|---|---|---|
| 2,412,761 | 12/1946 | Williams | 88—24 |
| 3,020,799 | 2/1962 | Schwarzbach | 88—24 |
| 3,260,154 | 7/1966 | Tchejeyan et al. | 88—24 |

RICHARD B. WILKINSON, *Primary Examiner.*
JOSEPH W. HARTARY, *Assistant Examiner.*

U.S. Cl. X.R.

88—24; 350—285